(No Model.)

C. F. WARNER.
PNEUMATIC TIRE.

No. 500,639.  Patented July 4, 1893.

Witnesses:
Harry T. Rohrer
Aly Stewart

Inventor
Charles F. Warner,
By Louis Feeser
his Attorney.

UNITED STATES PATENT OFFICE.

CHARLES FRANKLIN WARNER, OF CLEARWATER, MINNESOTA.

PNEUMATIC TIRE.

SPECIFICATION forming part of Letters Patent No. 500,639, dated July 4, 1893.

Application filed September 23, 1892. Serial No. 446,723. (No model.)

*To all whom it may concern:*

Be it known that I, CHARLES FRANKLIN WARNER, of Clearwater, in the county of Wright and State of Minnesota, have invented certain new and useful Improvements in Pneumatic Tires; and I do hereby declare the following to be a full, clear, and exact description of the same, reference being had to the accompanying drawings, forming a part of this specification, and to the letters of reference marked thereon.

This invention relates to inflated vehicle tires, particularly such as are adapted for use on bicycles, and it has for its object to prevent the bursting of the tire under excessive internal pressure, or the perforation or puncturing of the same by contact with sharp or cutting bodies, such as glass, nails, &c., frequently encountered in traveling over the highways.

A further object of the invention is to improve the resiliency and ease of running of such tires, whereby the ease of the rider is materially increased.

The invention consists in certain novel details of construction and combinations and arrangements of parts, all as will be now described and pointed out particularly in the appended claims.

Figure 1:
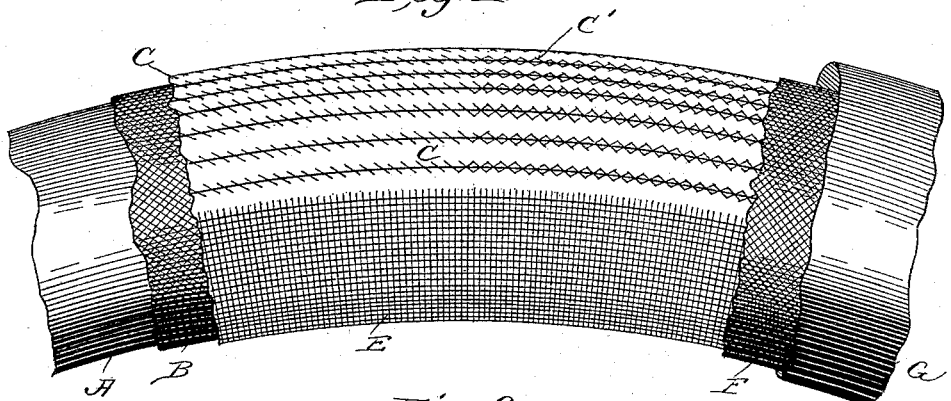
Figure 2:
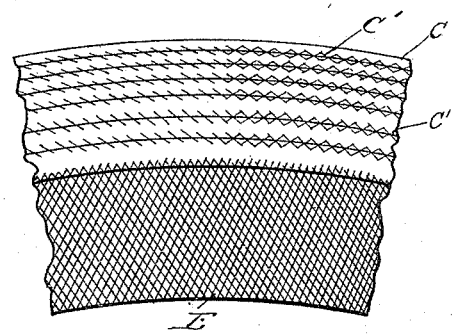
Figure 3:
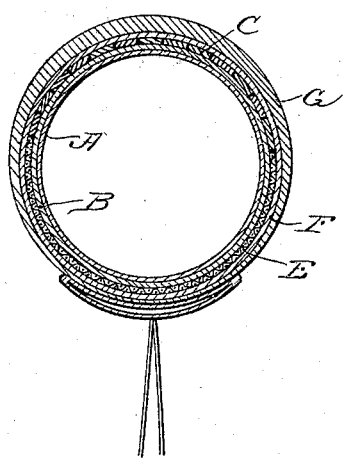
Figure 4:
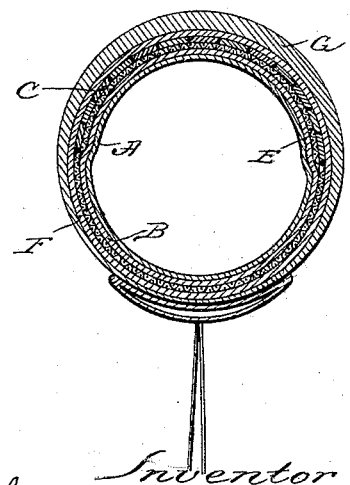

Referring to the accompanying drawings: Figure 1 is a side elevation of a section of a tire constructed in accordance with my invention. Fig. 2 is a similar section showing the diagonal woven wire sheathing. Fig. 3 is a transverse section through a tire constructed in accordance with the invention. Fig. 4 is a similar view showing the woven wire in the form of a complete sheath embodied in the tire.

Like letters of reference in the several figures indicate the same parts.

In carrying out this invention the usual soft rubber tube A is employed as the inner air tight vessel, and surrounding it is the flexible but inelastic fabric sheath B. Outside of this fabric, preferably canvas, sheath, embedded in rubber cement, is the metallic protective layer, consisting in the preferred construction, of a series of relatively narrow thin strips C of metal such as a compound of steel, nickel and aluminum or nickel and aluminum, running longitudinally around the tread of the tire and joined together by flexible connections. The flexible connection shown is lacing C' of wire passed through perforations in the edges of the strips and crossed and re-crossed as shown at the right in Fig. 1, or simply laced back and forth as shown at the left in said figure. To further protect the tire against perforation and also to hold the longitudinal metal strips in place, a woven wire sheathing is employed; thus in Fig. 1 E indicates a woven wire section of sheathing joined to the edge strips C and extending around the inside of the tire. This woven wire fabric may be straight, as shown in said figure, but in the preferred construction the strands run diagonally around the tire as illustrated clearly in Fig. 2, whereby the flexibility and expansibility of the tire are not interfered with.

In some instances as illustrated in Fig. 4, for instance, it may be desirable to form a complete inclosing sheath of the diagonally woven wire fabric affording a greater protection and even without the longitudinal strips forming an efficient protective sheathing. The wire fabric is embedded in rubber cement and, outside of it and the metal strips, is another sheath of canvas F which is in turn covered by a rubber sheath G of the usual kind forming the wearing surface, and preferably thickened on the outer or tread side.

A tire constructed in accordance with this invention will be found to possess all the qualifications desirable or necessary in a pneumatic tire, and in addition thereto, it will be found practically indestructible by perforation, bursting or other similar causes due to hard use or misuse, such as increasing the pressure within it excessively, or riding it over sharp substances, which under ordinary conditions would render the tire useless.

Having thus described my invention, what I claim as new is—

1. In a pneumatic tire, the combination with the flexible air tight sheaths, of the metal strips extending longitudinally of the tire and laced together by flexible connections along their entire length; substantially as described.

2. In a pneumatic tire, the combination with the flexible air tight sheaths, of the strips of metal extending longitudinally of the tire on the outside and united by flexible connections and the wire fabric passing around the inner side of the tire and connecting the outer metal strips; substantially as described.

3. In a pneumatic tire, the combination with the flexible air tight sheaths, of the flexible metal strips extending longitudinally of the tire and the woven wire for holding said strips in place; substantially as described.

4. In a pneumatic tire, the combination with the flexible air tight sheaths, of the flexible metal strips extending longitudinally of the tire and the diagonally woven wire sheathing for holding said strips in place; substantially as described.

5. In a pneumatic tire, the combination with the flexible air tight cell, canvas sheaths and outer elastic wearing sheathing, of the flexible metallic strips interposed between the canvas sheaths longitudinally of the tire and united by lacing and the diagonally woven wire sheathing also interposed between the canvas sheaths and connected to the flexible metallic strips; substantially as described.

In testimony whereof I have hereunto set my hand in the presence of two subscribing witnesses.

CHARLES FRANKLIN WARNER.

Witnesses:
LOUIS FEESER, Jr.,
JOHN F. BURGGEMANN.